Oct. 25, 1932.  A. DINA  1,884,603
LIGHT RAY PROJECTOR
Filed May 19, 1925  4 Sheets-Sheet 1

INVENTOR
Augusto Dina
BY
ATTORNEY

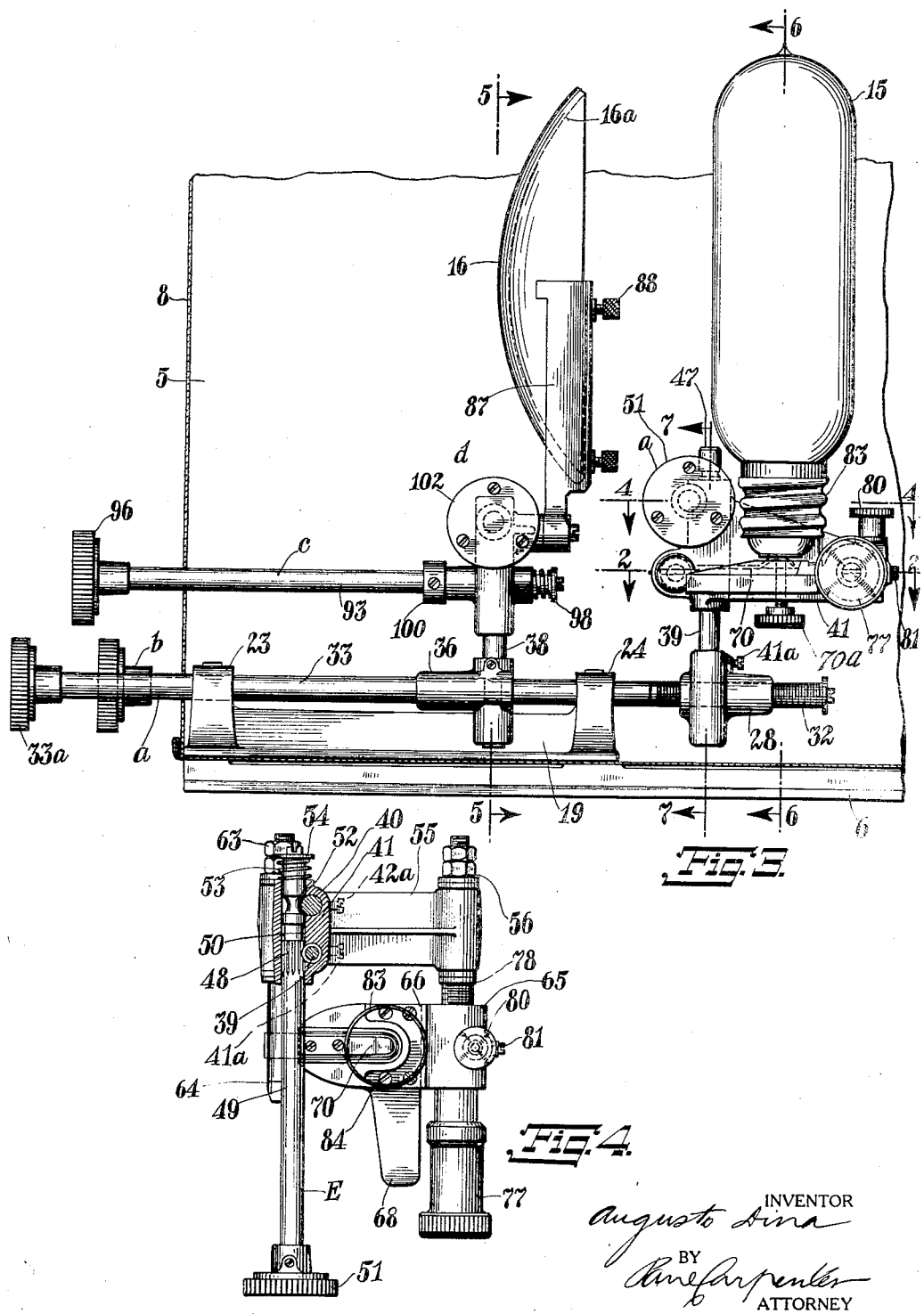

Oct. 25, 1932.  A. DINA  1,884,603
LIGHT RAY PROJECTOR
Filed May 19, 1925   4 Sheets-Sheet 3
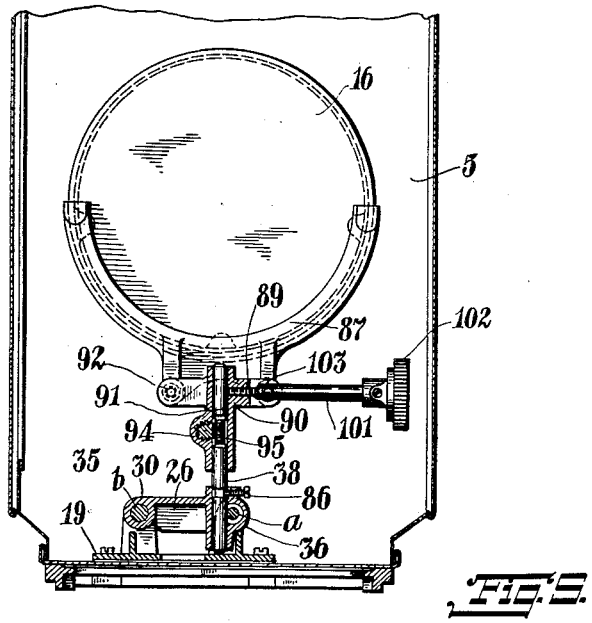
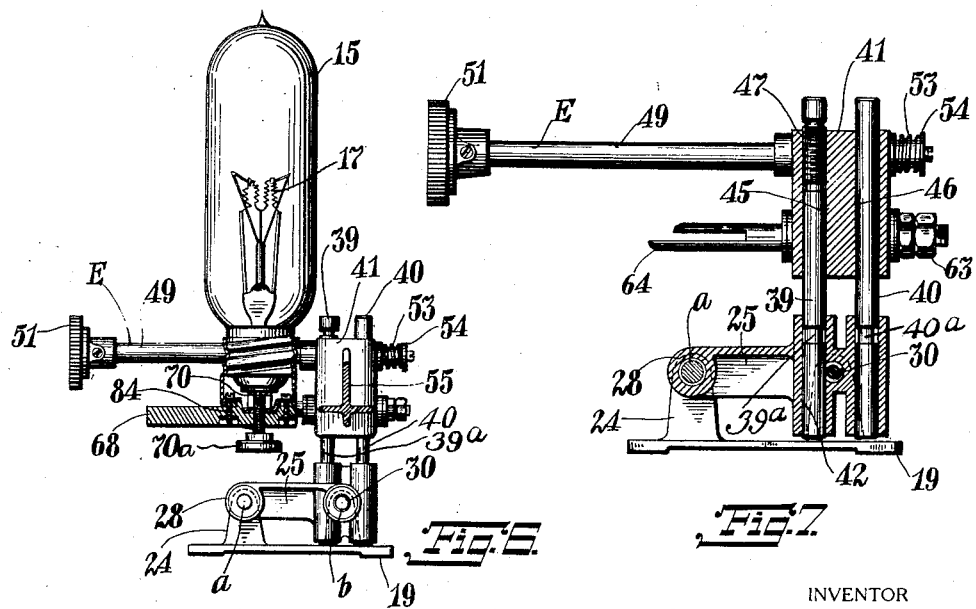
INVENTOR
Augusto Dina
BY
ATTORNEY Patented Oct. 25, 1932

1,884,603

UNITED STATES PATENT OFFICE

AUGUSTO DINA, OF JERSEY CITY, NEW JERSEY, ASSIGNOR, BY MESNE ASSIGNMENTS, TO INTERNATIONAL PROJECTOR CORPORATION, OF NEW YORK, N. Y., A CORPORATION OF DELAWARE

LIGHT RAY PROJECTOR

Application filed May 19, 1925. Serial No. 31,419.

This invention relates broadly to supports and more particularly to improvements in adjustable supports, especially useful for supporting a plurality of elements for adjustment in angularly related planes, such, for instance, as the lamp and reflector of a light projector, and to this end the invention finds particular utility for employment in a motion picture projector.

This invention is illustrated and described as applied to the lamp and reflector of a motion picture projector for the purpose of affording the desired adjustment of the lamp and reflector relatively to each other and to the condenser lens for obtaining proper focus and for attaining the maximum possible efficiency of the device, the supporting elements including certain improved features as pointed out hereinafter. Owing to the accuracy necessary to the attainment of the desired results, the device includes the provision of threaded connections which permit of a very fine adjustment of certain parts as will appear.

The principal objects and advantages of this invention reside in the provision broadly of an improved supporting device; the provision of an improved means for supporting a plurality of elements bearing a predetermined relationship; the provision of improved supporting means for two or more elements for relative adjustment; the provision of an improved supporting means for a plurality of elements whereby such elements may be relatively adjusted in a plurality of relatively different planes; the provision of an improved supporting device permitting of relative adjustment of a plurality of elements supported thereby in a plurality of relatively different horizontal and vertical planes; the provision of an improved supporting device having means whereby relatively fine adjustments of a plurality of elements may be made in a plurality of angularly related planes; the provision of a device of the character described, whereby a plurality of devices to be supported may be adjusted in a plurality of angularly related planes, and whereby such elements to be adjusted may be removed and replaced individually without disturbing the adjustments of the elements supported; and the provision of a device of the character described which includes means for supporting a plurality of elements for relative adjustment in horizontal and vertical planes, and whereby the supporting device as a whole is a compact, complete unit capable of installation in various mechanical arrangements without material alteration of the parts thereof.

This invention is further characterized by the provision of an improved device for supporting a projection lamp and a reflector for relative adjustment; the provision of an improved device for supporting a projection lamp and a reflector for relative adjustment in a plurality of angularly related planes; the provision of a device of the character described for supporting a projection lamp and a reflector removably in mobile positions whereby these elements may be relatively adjusted or removed and replaced without disturbing the relative adjustments made; the provision of a supporting device for a projection lamp whereby the lamp may be vertically or horizontally adjusted relatively to the axis of projection; the provision of an improved supporting device for a reflector whereby the reflector may be vertically or horizontally adjusted relatively to the axis of projection or reflection of light rays; the provision of a unit support for a projection lamp and a reflector whereby the lamp and reflector may be relatively vertically and horizontally adjusted to properly focus these elements with respect to a condensing lens; the provision of a support for a projection lamp and a reflector whereby the lamp and reflector may be adjusted upon or angularly to the line of projection of light rays either simultaneously or independently; the provision of a support for a projection lamp and reflector having means permitting the lamp or reflector or both to be simultaneously removed and replaced, relatively adjusted upon or angularly with respect to the line of light projection and to permit such removal or replacement to be made without disturbing the adjustments made originally; and the provision of a support for a projection lamp and a reflector which affords means whereby the lamp, reflector and supporting means may be inserted into a lamp house as a complete unit without material alteration of the then existing structure of the projection apparatus, thereby having particular utility in adaptation to the conventional form of motion picture projection now in general use.

This invention is also characterized by the provision of an improved lamp holder; the provision of an improved lamp holder and socket; the provision of an improved lamp holder and socket particularly adapted for use where various adjustments of these elements are desirable or necessary; the provision of an improved lamp holder which has means whereby the lamp may be adjusted and fixed in position in the holder prior to insertion in the lamp house; and the provision of an improved lamp holder and support therefor having improved means for making such electrical connections as may be required and for making such connections semi-automatically without the necessity of removing lead in wires or of removing any electrical contact members forming terminals of such lead in wires.

The foregoing and such other objects and advantages as may appear or be pointed out as this description proceeds are attained in the structural embodiment of the present invention illustrated in the accompanying drawings, in which:

Figure 3 is an enlarged elevational view of the device shown in Figure 1;

Figure 4 is an enlarged sectional view taken on the line 4—4 of Figure 3, looking in the direction indicated by the arrows;

Figure 8:
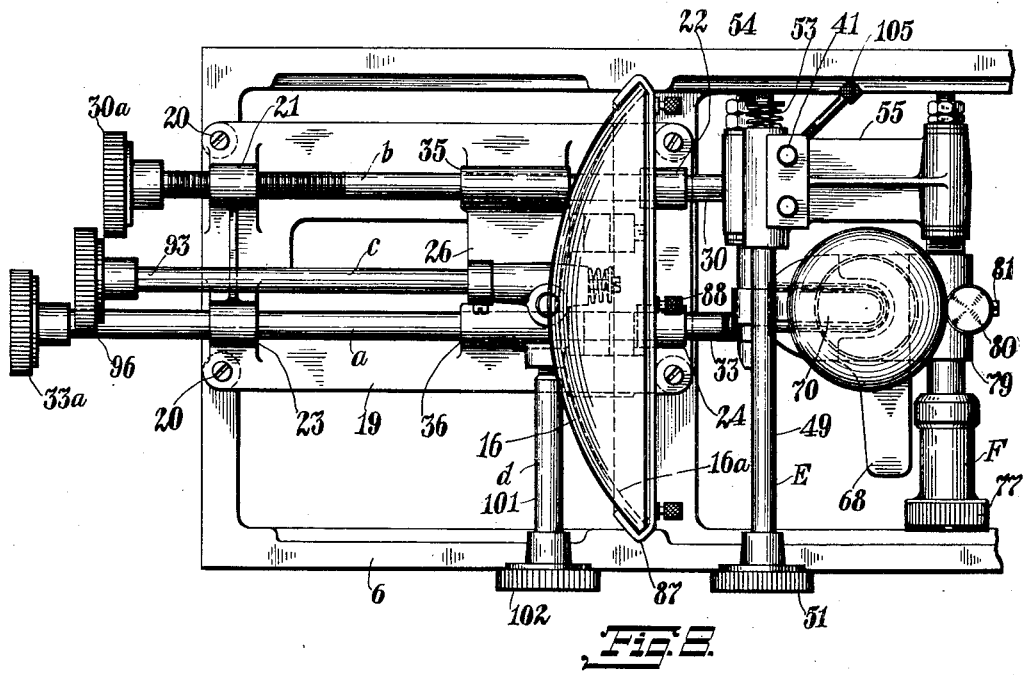

Figures 5, 6 and 7 are vertical sectional views taken on the lines 5—5, 6—6 and 7—7, of Figure 3, looking in the direction indicated by the arrows;

Figure 8 is a top plan view of the device shown in Figure 3; and

Figure 1:
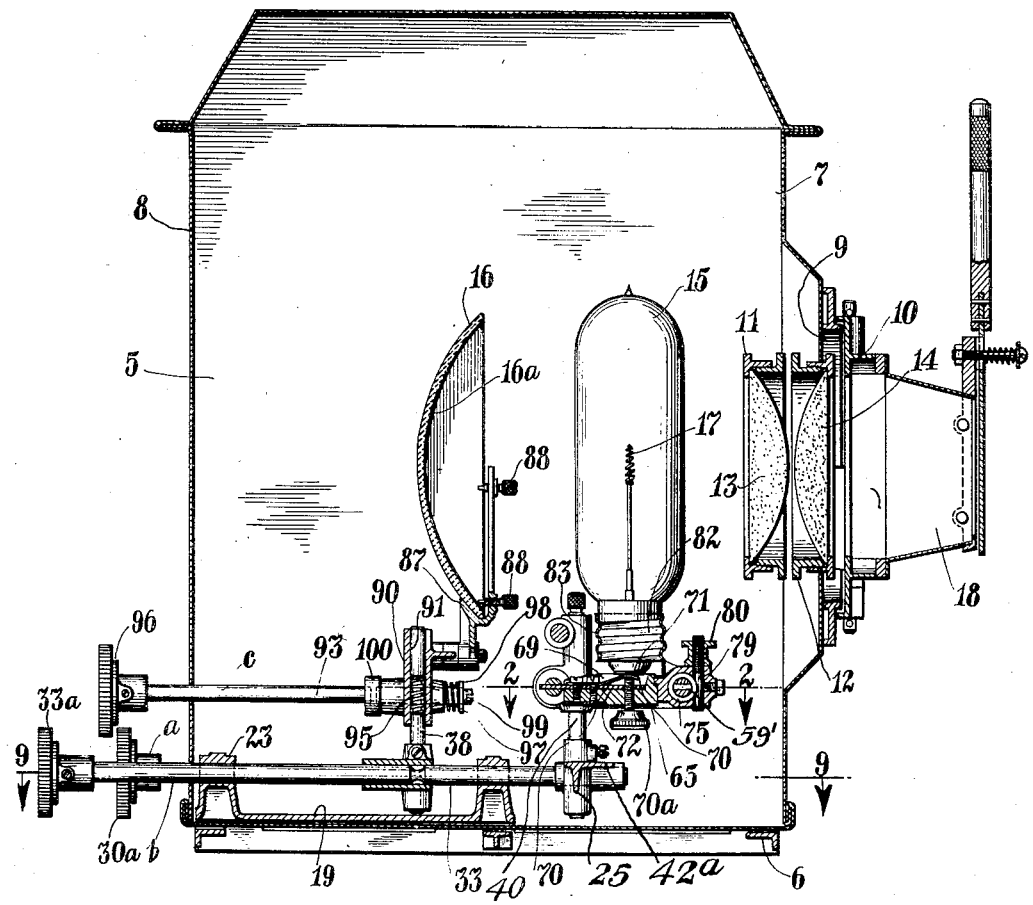
Figure 1 is a vertical sectional view of the lamp house and condenser lenses of a motion picture projector, including the improved lamp and reflector supporting device of my invention.
Figure 9:
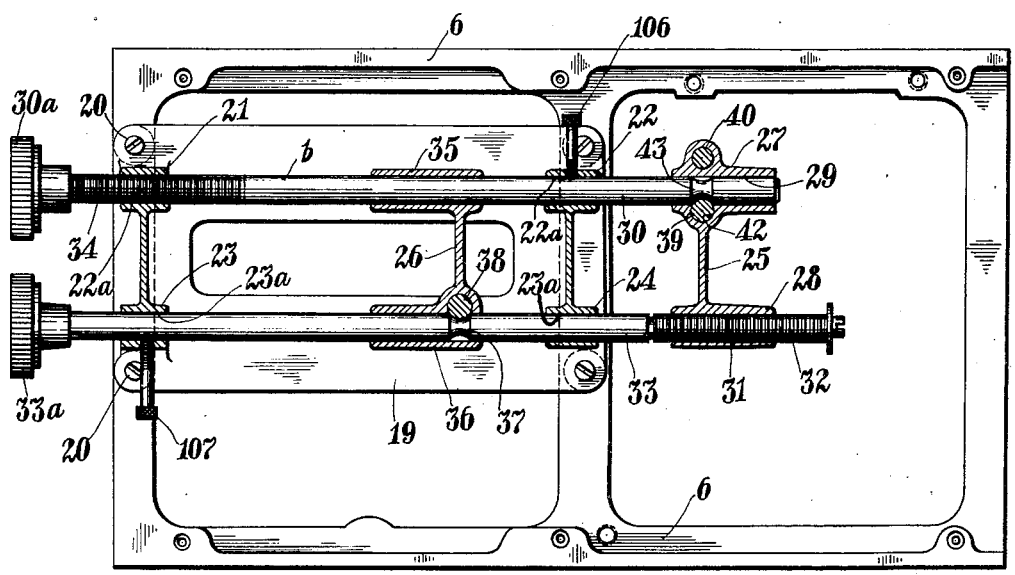

Figure 9 is a longitudinal sectional view taken on the line 9—9 of Figure 1, looking in the direction indicated by the arrows.

Referring now more particularly to the drawings, and first generally to Figure 1, 5 is a conventional form of lamp house which includes a base 6 and front and rear walls 7 and 8, respectively. The front wall 7 is provided with an opening 9 in which a hinged door 10 is mounted, said door carrying the frames 11 and 12, which in turn support the condensing lenses 13 and 14, which latter are adjustable in proper position in a conventional way.

Within the lamp house and to the rear of and preferably substantially in axial alignment with the condensing lenses 13 and 14, I provide a lamp 15, which, in the present instance, is of the incandescent type, and a reflecting member 16.

It is necessary, as will be obvious, that, in order that the maximum efficiency of the lamp be produced, the relation of the filament 17 thereof to the condensing lenses and to the reflector be such that all or nearly all of the effective light rays be projected through the condensing lenses and through the outlet 18 onto the screen (not shown). In order to attain the desired relationship of these elements, I mount the lamp and the reflector so that they may both be adjusted in relatively angularly related planes and relatively to each other whereby an operator, by manipulation of such adjustment, may observe the results, and so that renewal of the reflector or lamp may be accomplished without disturbing such adjustments as had been previously made.

The lamp and reflector support are carried, in their entireties, by an auxiliary base member 19 secured fixedly to the base 6 by provision of machine screws 20—20, said base member 19 being provided with upstanding lugs 21, 22, 23 and 24, the lugs 21 and 22 having axially aligned openings 22a, and the lugs 23 and 24 also having axially aligned openings 23a.

The opening 22a in the lug 21 is threaded for a purpose which will presently appear.

The lamp support includes a yoke member 25 and a reflector support includes a complementary yoke member 26, said yoke members being simultaneously or relatively movable in horizontal planes as will later appear.

The yoke member 25 is provided at opposite sides with elongated lugs 27 and 28, the former having an elongated opening 29 for reception of one end of an actuating shaft 30, and the lug 28 having an elongated threaded opening 31 for reception of the threaded end 32 of an auxiliary actuating shaft 33. The actuating shaft 30 is longitudinally displaceable along its axis of rotation in the openings 22a in the lugs 21 and 22, by virtue of the threaded portion 34 of the shaft 30 engaging the threaded openings in the lug 21, and the shaft 33 is slidable in the openings in the lugs 23 and 24 together with said shaft 30 by virtue of the engagement of the threaded portion 32 of the shaft 33 with the yoke 25.

The yoke 26 is provided with apertured lugs 35 and 36 which engage with the shafts 30 and 33, respectively, the engagement of the lug 35 with the shaft 30 being a slidable and rotatable one, and the engagement of the lug 36 with the shaft 33 being a rotatable but non-slidable connection by virtue of a circumferential groove 37 in the shaft 33, and the engagement in said groove of a vertical post 38 which serves an additional function which will presently appear.

The yoke 25 is rotatably but non-slidably connected to the shaft 30 by virtue of one of the supporting posts 39, there being two provided, the supporting post 40 and said post 39 cooperating to vertically displaceably support the lamp bracket 41. The post 39 extends downwardly through an opening 42 in the enlarged part 27 of the yoke 25 and is engaged in a circumferential groove 43 formed in the shaft 30 whereby said shaft may rotate in the yoke 25, but such rotation will cause the yoke to move longitudinally with said shaft. The assembly of the member 41 will be described presently.

By the arrangement so far described, it will be seen that the lamp supporting yoke 25 may be displaced in a horizontal plane along an axis parallel with the axis of the condensing lenses, that is, the axis of projection of the light, and that the reflector yoke may similarly be adjusted, such adjustments being either simultaneously or independently. For instance, the yoke 25 may be moved longitudinally by rotating the handle or knob 30a provided on the shaft 30, and similarly the yoke 26 may be adjusted by rotating the knob 33a on the shaft 33. Rotation of the shaft 30 causes both the yoke 25 and the yoke 26 to be moved longitudinally toward and away from the condenser though the position of the reflector yoke 26 may be maintained by simultaneously rotating the shafts 30 and 33 in opposite directions to the same extent. In making such adjustments, however, it is preferable that the lamp be adjusted to a predetermined position and then the reflector adjusted by means of the rotation of the shaft 33, said shaft moving longitudinally of the yoke 35 by virtue of the threaded portion 32 and thus adjusting the yoke 26 toward or away from the yoke 25.

The reflector in the present instance is of a curved form and presents toward the lamp a substantially spherical reflecting surface 16a, and it is found to be desirable that the axis of the filament 17 and the lamp 15 be disposed in a vertical plane substantially half above and half below the horizontal axis of the condensing lens and so that the intersection of the planes mentioned will be a theoretical center from which the curvature of the reflector is described.

The lamp support, or bracket, includes a body portion shown at 41 provided with parallel vertical bores 45 and 46 for accommodating the supporting posts 39 and 40, the post 39 adjacent its upper end being provided with circumferential notches or grooves 47 for engaging with the teeth 48 formed in an operating shaft 49 which latter extend through and are rotatable in the transverse bore 50 in said body 41. The shaft 49 is provided with a knob 51 by which said shaft may be rotated and whereby the bracket 41 may be elevated or depressed on the supporting posts 39 and 40.

The posts 39 and 40 are retained in the yoke 25 by the provision of grooves 39a and 40a in said posts and by the engagement of set screws 41a and 42a in said grooves. The bracket 41 may be removed simply by removing the set screw 41a which permits the bracket and post 39 to be raised off the post 40.

Longitudinal movement of the shaft 39 in the body 41 is afforded by virtue of the circumferential groove 52 which engages with the post 40, and said shaft 49 is maintained snugly in its bearing by the helical spring 53 which surrounds the shaft 49 and abuts the washer 54 and the body 41. This spring 53 also serves as a friction brake which maintains the bracket 41 in an adjusted position.

Figure 2:
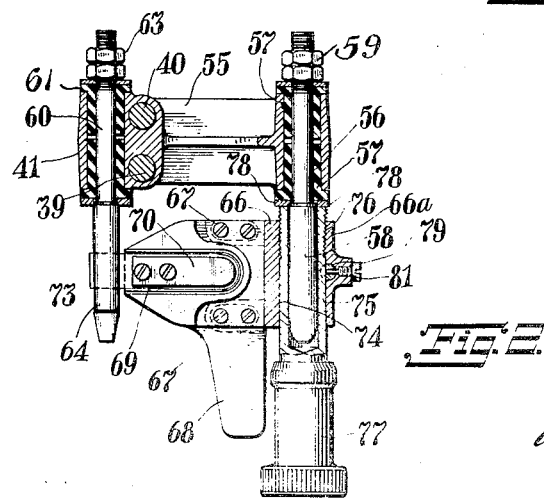
Figure 2 is a transverse horizontal sectional view taken on the line 2—2 of Figure 3, looking in the direction indicated by the arrows.

The body 41 is provided with a lateral extension 55 which serves to support one of the electrical terminals of the lamp holder, as at 56. The detail construction of the lamp holder per se is best shown in Figures 2 and 4, wherein it will be observed that the extension 55 is provided with a transverse opening in which bushings 57 of insulating material are placed for supporting the terminal or binding post 56.

The binding post 56 is provided with an enlarged portion 58 which abuts the projecting end of the bushing 57 and nuts 59 are in engagement with other of the bushings, thus retaining the binding post 56 in position. The enlarged portion 58 of the binding post 56 is split longitudinally as at 59', to form a resilient finger for a purpose which will presently appear.

A second binding post 60 is provided, mounted in the insulating bushings 61—61 in the enlarged portion 62 of the body 41, said binding post 60 being supported by the nuts 63 and the enlarged finger portion 64, which latter is split longitudinally for a purpose which will presently appear.

The lamp holder itself includes a base member 65, formed of a suitable insulating material and having a casting 66 bolted as at 67—67 to one side thereof. The base member 65 has a handle portion 68, and said base is provided with a recess 69 in which is seated the adjustable resilient contact terminal 70 which is adapted to engage the bottom contact 71 on the incandescent lamp 15. The resilient contact member 70 is riveted or bolted or otherwise fixedly secured to the plate 72 which latter is fixed in the recess 69 and extends beyond the same for engagement at 73 in the slot formed in the enlarged portion 64 of the binding post 60. The contact 70 is adjusted and locked by a set screw 70a operating in the plate 72.

The casting 66 is provided with an enlarged portion 66a having a transverse bore 74 for reception of an adjusting member 75 which is tubular and adapted to receive the split portion 58 of the binding post 56. The tubular member 75 is threaded as at 76 in the portion 66a and said tubular member 75 is provided with a handle or knob 77 whereby the tubular portion 75 may be rotated to cause the inner end thereof to abut a washer 78 and thus adjust the lamp holder proper with respect to the lamp bracket 41. Such adjustments of the lamp holder, that is, the position of the member 75 and the member 66a are maintained by the provision of a locking pin 79 recessed to engage the tubular member 75 as best seen in Figure 1, said locking member 79 having a set screw 80 for tightening the member 79 against the tubular member 75. The locking member 79 is prevented against removal from its position when the tubular member 75 is withdrawn by the provision of a retaining screw 81.

The lamp 15 is provided with a screw threaded base 82 engaged in a socket member 83, it being observed that the socket member is in connection with the casting 66 by the provision of the retaining screws 84 shown in Figure 4, the circuit for the lamp thus being established through the binding posts 56 and 60, casting 66, socket 83 and contact member 70.

Referring now to the reflector support, it will be observed that the standard 38 carried by the yoke member 26 is retained against vertical displacement therein by provision of a set screw 86 engaging in a circumferential groove in the standard 38, the reflector support proper including a semi-circular grooved member provided with set screws 88—88 for retaining the reflector 16, said grooved member being detachably secured to the arms 89 of a supporting member 90, the latter having a vertical opening 91 for reception of the supporting standard 38. Bolts 92, best shown in Figures 1 and 5, serve to detachably secure the reflector seat member 87 to the arms 89.

The member 90 is vertically displaced on the standard 38 by the provision of a manipulating shaft 93 extending laterally of the standard 38 and being provided with teeth as at 94 for engagement with circumferential grooves 95 in the standard 38, a knob or handle 96 being provided on the outer end of the shaft 93. A helical spring 97 surrounds the shaft 93 and a washer 98 and bolt 99 serve to cooperate with a collar 100 on the shaft 93 for preventing its longitudinal displacement relatively to the member 90, and for frictionally holding the reflector in a vertical adjustment. For locking the reflector support against any movement relatively to the standard 38, I provide a laterally extending shaft 101 having a handle or knob 102 and threaded at 103 into the member 90 to form a set screw for impingement upon the standard 38 as will best be seen from an inspection of Figure 5. It will be obvious that when the shaft 101 is rotated to release engagement thereof with the standard 38, the reflector support is capable of rotatable and vertical displacement on the standard 38.

After the condenser lenses have been properly placed in the lamp house, the adjustments of the lamp and reflector are made. Preferably, the lamp is first placed in its holder, that is, in the socket 83, by releasing the set screw 70a which underlies the contact member 70 and screwing said lamp into its socket until the filament 17 thereof lies in a plane parallel with the axis of the member 75. The filament 17, as will be seen from an inspection of Figure 6, is conveniently of a monoplane type, rendering more facile the manipulation of the lamp to make said filament parallel with the member 75. After the lamp has been so adjusted, the set screw 70a is tightened, thus fixedly securing the setting of the lamp and at the same time affording a firm contact between the bottom terminal 71 of the lamp and the spring strip 70.

The lamp and lamp holder are now ready for insertion into the lamp house and attachment to the lamp bracket. The attachment referred to is accomplished by sliding the lampholder onto the binding posts 56 and 60, care being taken that the tubular member 75 accurately engages the member 58 and that the projecting end of the strip 72 accurately engages in the slot of the binding post 64. The lamp holder is now slid into position until the inner end of the member 75 abuts the washer 78 and future adjustments of the lamp transversely of the bracket are accomplished by manipulation of the handle 77. After the desired adjustments have been made the nut 80 is tightened and these adjustments will be maintained. By manipulation of the shaft 49 the lamp may be raised and lowered and similarly by manipulation of the shaft 93 the reflector may be raised and lowered. The adjustments of the holders longitudinally, that is, along the axis of the projection of light, is accomplished by manipulation of the shafts 30 and 33 as previously pointed out. The settings of the lamp as to vertical displacement are maintained by the provision of a set screw 105 which impinges upon the post 40, and adjustments of the two shafts 30 and 33 are maintained by set screws 106 and 107, respectively.

From the foregoing, it will be seen that joint longitudinal adjustment of the lamp and reflector is made by rotation of the handle 30a, the threaded part 34 producing thereby a longitudinal displacement of the yoke member 25 by virtue of its fixed engagement with the rod operated by said handle 30a. In view of the fact that the yoke member is for this adjustment immovable with respect to the rod 33, the latter is moved with the yoke member slidably in the bearings 23 and 24, and by virtue of the fixed engagement of the complementary yoke member 26 with the rod 33, the two members 25 and 26 are thereby moved simultaneously longitudinally of the base. This adjustment may be held fixed by tightening the set screws 106 and 107. Individual relative adjustment of one or both of the lamp and the reflector may be accomplished by relatively rotating the two handles 30a and 33a. Rotation of these two handles will cause a duplex movement, that is, there will be a simultaneous forward or back adjustment of the lamp and reflector and a relative adjustment of these two elements. This is by virtue of the fact that the reflector is carried by the yoke member 26 and the lamp is carried by the yoke member 25.

Assuming that the relative positions of the lamp and reflector with respect to longitudinal displacement relatively to each other and to the condensing lenses have been attained, vertical adjustment of these two elements is accomplished in the following manner:

To adjust the lamp vertically with respect to the yoke member 26 and therefore with respect to the focal axis of the reflector, the handle 51 is rotated. Rotation of the handle 51 imparts rotative movement to the tooth portion 48, which engages with the post 39. This causes a vertical movement of the bracket 55 on the two posts 39 and 40 and as the lamp is mounted on the bracket 55 by virtue of the structure shown in Figures 2, 4, 6 and 7, the lamp itself will be caused to move vertically. In the event that lateral horizontal movement of the lamp is desired, the knob 77 may be rotated to advance or retract the binding post 56, and as this binding post is fixedly carried by the member 55, a limitation of the degree to which the contact member 58 can enter the member 75 will be determined and thereby the relative position of the lamp laterally of the longitudinal axis of the device. It will be understood that the lamp socket is thus relatively laterally adjusted, and as the lamp is carried by this socket, it will accordingly be adjusted in the manner prescribed.

As pointed out, it is essential in some instances that the center of the light source be on the focal axis of the reflector and that in the event that the lamp burns out and a new lamp is supplied, the threads on the base of the lamp may not bring the filament into exactly the right position without additional adjustment of the parts described, such as, for instance, an additional adjustment of the handle 51 or even of the handles 30a and 33a. Obviously, this requires time and where the machine is in operation would be of considerable annoyance to the spectators viewing a picture. In the present arrangement, in order to facilitate inserting a new lamp in position, the whole lamp socket is removable readily and a duplicate lamp, which has been previously adjusted for just such an emergency on another lamp socket, may be quickly and readily substituted without the necessity of adjusting the lamp in its socket. However, in order to facilitate such an adjustment where necessary, the adjustable resilient contact terminal 70 is provided, which is adapted to engage the bottom contact on the lamp. This contact terminal 70 is not only adjustable but can be adjusted and its adjustment maintained by the provision of the set screw 70a. Furthermore, this arrangement locks the lamp in its socket against accidental displacement due to vibration of the apparatus when applied to a motion picture projector.

In the event it is desired to further adjust the reflector such, for instance, where a limit of the degree of adjustment of the lamp within a reasonable degree has been attained, the reflector may be vertically adjusted by rotation of the handle 96 and this rotation of the handle 96 will cause the reflector bracket to be raised or lowered on the supporting post 38. In the event that due to accident the reflector should become overheated and crash or otherwise become damaged, I provide for the ready replacement of the reflector and to this end the post 38 is readily removable from the yoke member 36 by backing off on the set screw 86. This arrangement permits of the bodily removal of the reflector bracket and adjusting parts, and the latter is thereby susceptible of replacement immediately, similarly to the lamp, with another reflector all adjusted and set in its bracket.

Having thus described my invention and illustrated its use, what I claim as new and desire to secure by Letters Patent is:

1. In a device of the character described, in combination, a base having guiding means thereon, a pair of spaced supporting rods arranged for parallel movement relatively to said base, yoke members connecting said rods and fixed respectively to one each thereof for movement therewith in one direction only, and auxiliary supporting devices carried by each of said yokes, whereby manipulation of one or the other of said rods will produce, respectively, relative or simultaneous movement of said yokes and auxiliary supporting devices relatively to said base.

2. In a device of the character described, in combination, a base having guiding means thereon, a pair of spaced supporting rods arranged for parallel movement relatively to said base, yoke members connecting said rods and fixed respectively to one each thereof for movement therewith in one direction only, and auxiliary supporting devices carried by each of said yokes, whereby manipulation of one or the other of said rods will produce, respectively, relative or simultaneous movement of said yokes and auxiliary supporting devices relatively to said base.

3. In a device of the character described, in combination, a base having guiding means thereon, a pair of spaced supporting rods arranged for parallel movement relatively to said base, yoke members connecting said rods and fixed respectively to one each thereof for movement therewith in one direction only, one of said rods being in rotatable threaded engagement with the base, the other of said rods being in slidable engagement with the base and in rotatable threaded engagement with one of said yokes, and auxiliary supporting devices carried by each of said yokes, whereby manipulation of one or the other of said rods will produce, respectively, relative or simultaneous movement of said yokes and auxiliary supporting devices relatively to said base.

4. In a device of the character described, in combination, a base member having upstanding lugs provided with axially aligned openings, a pair of supporting rods mounted in spaced relationship for movement in said lugs, yoke members connecting said rods and respectively fixed to one and movable therewith in one direction only and movable relatively to the other thereof, so that manipulation of one or the other of said rods will move one or both of said yokes respectively in a horizontal plane, a lamp carried by one of said yokes, and a reflector for said lamp carried by the other of said yokes.

5. In a device of the character described, in combination, a base member having upstanding lugs provided with axially aligned openings, a pair of supporting rods mounted in spaced relationship for movement in said lugs, yoke members connecting said rods and respectively fixed to one and movable therewith in one direction only and movable relatively to the other thereof, so that manipulation of one or the other of said rods will move one or both of said yokes respectively in a horizontal plane, a lamp carried by and vertically adjustable upon one of said yokes, and a reflector for said lamp carried by and vertically adjustable on the other of said yokes.

6. In a device of the character described, in combination, a base member having upstanding lugs provided with axially aligned openings, a pair of supporting rods mounted in spaced relationship for movement in said lugs, yoke members connecting said rods and respectively fixed to one and movable therewith in one direction only and movable relatively to the other thereof, so that manipulation of one or the other of said rods will move one or both of said yokes respectively in a horizontal plane, a lamp carried by and vertically and laterally adjustable upon one of said yokes, and a reflector for said lamp carried by and vertically adjustable on the other of said yokes.

7. In a device of the character described, in combination, a support, means for adjusting said support in a plurality of planes, a lamp carriage having a socket and adapted to be placed in an adjusted position on said support, an adjustable contact terminal in said socket, a lamp receivable in said socket upon said contact, means for adjusting said contact toward and away from said lamp, and means for maintaining such adjustment.

8. In a lamp and reflector support, a base member, a yoke member carrying the lamp, a propelling member for said yoke having threaded engagement with said base, a second yoke member carrying the reflector and supported in part by said propelling member, a second propelling member parallel to said first propelling member and fixed to said second yoke and having threaded engagement with the first named yoke and in part supporting the latter, said second propelling member having sliding engagement with the base.

9. In a device of the character described, in combination, a relatively fixed base, a supporting member, a lamp carried thereby, a propelling member therefor threaded into said base, an auxiliary supporting member, a reflector for the lamp carried thereby, and an additional propelling member therefor threaded in said supporting member and slidable in said base.

10. In a device of the character described, in combination, a relatively fixed base, a supporting member, a lamp carried thereby, a propelling member therefor threaded into said base, an auxiliary supporting member, a reflector for the lamp carried thereby, and an additional propelling member therefor threaded in said supporting member and slidable in said base, said propelling members being parallel and both guided by the base and serving as a joint supporting means for the lamp and reflector.

11. In a device of the character described, in combination, a support including a pair of parallel posts, a base for carrying said posts, independent means for retaining each said posts readily removably in said base, a bracket supported by the posts, a shaft carried by the bracket and operatively engaging one of said posts for propelling the bracket thereon, the bracket sliding on the other post, removal of said bracket from the posts being permitted by disengagement of one of said posts from said base, the bracket sliding free of the remaining post.

12. In a device of the character described, in combination, a reflector, a lamp, a support for said lamp, a base, a lamp-adjusting member on said base and on which said lamp support is mounted, means for supporting the reflector from the lamp-adjusting member, and means for adjusting the reflector relative to the lamp in a plurality of directions.

13. In a device of the character described, in combination, a reflector, a lamp, a support for said lamp, a base, a lamp-adjusting member on said base and on which said lamp support is mounted, means for supporting the reflector from the lamp-adjusting member, and means for adjusting the reflector relative to the lamp in a plurality of directions, means for separately adjusting the lamp relative to the reflector, and means for adjusting the lamp and the reflector simultaneously as a unit.

In testimony whereof I have hereunto signed my name.

AUGUSTO DINA.